US011009653B2

(12) United States Patent
Clatanoff et al.

(10) Patent No.: US 11,009,653 B2
(45) Date of Patent: May 18, 2021

(54) OPTICAL COOLING SYSTEM (71) Applicant: 3M Innovative Properties Company, St. Paul, MN (US)

(72) Inventors: William J. Clatanoff, Austin, TX (US); Daniel J. Treadwell, Austin, TX (US); Phillip E. Tuma, Faribault, MN (US); Terry L. Smith, Roseville, MN (US); Donald K. Larson, Cedar Park, TX (US); Barry J. Koch, Florence, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 15/929,594

(22) Filed: May 12, 2020

(65) Prior Publication Data
US 2020/0379164 A1 Dec. 3, 2020

Related U.S. Application Data (60) Provisional application No. 62/853,267, filed on May 28, 2019.

(51) Int. Cl.
 *F21V 8/00* (2006.01)
 *G02B 6/38* (2006.01)
 *G02B 6/42* (2006.01)
(52) U.S. Cl.
 CPC ......... *G02B 6/0085* (2013.01); *G02B 6/3814* (2013.01); *G02B 6/4268* (2013.01)
(58) Field of Classification Search
 CPC ... G02B 6/0085; G02B 6/3814; G02B 6/4268
 USPC .................................. 385/15, 31, 39, 53–78
 See application file for complete search history.

(56) References Cited

U.S. PATENT DOCUMENTS

| | | | |
|---|---|---|---|
| 3,810,802 A | 5/1974 | Buhite et al. | |
| 3,864,018 A | 2/1975 | Miller | |
| 3,919,037 A | 11/1975 | Miller | |
| 4,046,454 A | 9/1977 | Pugh, III | |
| 4,124,364 A | 11/1978 | Dalgoutte | |
| 4,148,559 A | 4/1979 | Gauthier | |
| 4,227,951 A | 10/1980 | Mignien | |
| 4,580,874 A | 4/1986 | Winter et al. | |
| 4,662,713 A | 5/1987 | Davies et al. | |
| 4,717,233 A | 1/1988 | Szkaradnik | |
| 4,973,126 A | 11/1990 | Degani et al. | |
| 5,042,902 A | 8/1991 | Huebscher et al. | |
| 6,151,433 A | 11/2000 | Dower et al. | |
| 6,331,080 B1 | 12/2001 | Cole et al. | |

(Continued)

*Primary Examiner* — Michael P Mooney
(74) *Attorney, Agent, or Firm* — Robert S. Moshrefzadeh (57) ABSTRACT

An optical system including first and second optical elements for guiding light therein. For each optical element, the propagating light enters or exits the optical element through a coupling surface of the optical element. The coupling surfaces of the optical elements face, and align with, each other so that light propagating in one of the optical elements exits the optical element through the coupling surface of the optical element and enters the other optical element through the coupling surface of the other optical element. The coupling surfaces are separated from each other and define a region therebetween. The region is filled with a coolant, the coolant substantially surrounding at least one of the first and second optical elements.

14 Claims, 5 Drawing Sheets

(56) References Cited

U.S. PATENT DOCUMENTS

2005/0047456 A1* 3/2005 Rice ................... H01S 5/0243
372/35
2020/0026010 A1* 1/2020 Iwama ................ H04B 10/502

* cited by examiner

OPTICAL COOLING SYSTEM

TECHNICAL FIELD

The present disclosure generally relates to optical systems, and in particular to cooling systems for optical components.

BACKGROUND

Communication networks continue to expand bandwidth to meet increasing demands to deliver faster and better connections. Service providers meet these needs for greater bandwidth by incorporating fiber optics in the access network.

SUMMARY

Some aspects of the disclosure relate to an optical system having first and second optical elements for guiding light therein. For each optical element, the propagating light enters or exits the optical element through a coupling surface of the optical element. The coupling surfaces of the optical elements face, and align with, each other so that light propagating in one of the optical elements exits the optical element through the coupling surface of the optical element and enters the other optical element through the coupling surface of the other optical element. The coupling surfaces are spaced apart from each other and define a region therebetween. The region is at least partially filled with a coolant, and the coolant substantially surrounds at least one of the first and second optical elements.

Some other aspects of the disclosure relate to a system including a first optical system substantially entirely immersed in a circulating liquid coolant. The first optical system has first and second optical ferrules. The first optical ferrule is optically and physically connected to a first end of one or more optical fibers. The second optical ferrule is mounted on a circuit board. The circuit board is at least partially immersed in the circulating liquid coolant. The first and second optical ferrules are optically coupled to each other through respective first and second coupling surfaces. The first and second coupling surfaces face, and align with, each other and define a region therebetween. The region is at least partially filled with at least one of the liquid coolant or a vapor of the liquid coolant.

These and other aspects of the present application will be apparent from the detailed description below. In no event, however, should the above summaries be construed as limitations on the claimed subject matter, which subject matter is defined solely by the attached claims.

BRIEF DESCRIPTION OF DRAWINGS

The various aspects of the disclosure will be discussed in greater detail with reference to the accompanying figures where, FIGS. 1-4 schematically show different views of exemplary embodiments of immersion cooling of components of an optical system.

The figures are not necessarily to scale like numbers used in the figures refer to like components. However, it will be understood that the use of a number to refer to a component in a given figure is not intended to limit the component in another figure labeled with the same number.

DETAILED DESCRIPTION OF ILLUSTRATIVE EMBODIMENTS

In the following detailed description, reference is made to the accompanying drawings that form a part hereof, and in which are shown by way of illustration several specific embodiments. It is to be understood that other embodiments are contemplated and may be made without departing from the scope or spirit of the present disclosure.

Communication networks continue to expand bandwidth to meet increasing demands to deliver faster and better connections. As data communications rapidly progress toward 400 Gbps (and terabit data rates) and beyond, thermal management challenges that result remain a significant obstacle. Further, large scale computer server systems that perform significant workloads generate a large amount of heat during their operation. As the need for access to greater and greater processing and storage resources continues to expand, the density of server systems continues to increase. With the desire for increasing processing or storage density in these server systems, the thermal challenges that result remain a significant obstacle and there is a continuing need to increase the rate of heat transfer away from heat-dissipating components.

Optical signaling primarily uses pluggable optics on the circuit board edge. High speed circuit boards (about 400 Gbps and beyond) typically require on-board speeds and densities that are beyond the signal integrity capabilities of available pluggable optics with potential to streamline board manufacturing, thereby lower board manufacturing cost. Embedded optic modules are designed into system equipment to increase I/O density and bandwidth. Computing optical interconnects have evolved from pluggable card edge modules to on-board optics to integrated on-board optics. Data growth, and subsequently data center function growth and efficiency, will move toward electronics immersion cooling systems with optical cabling connectivity creating a potential for viable and reliable means for optical connectivity through immersion cooling systems.

Figure 1:
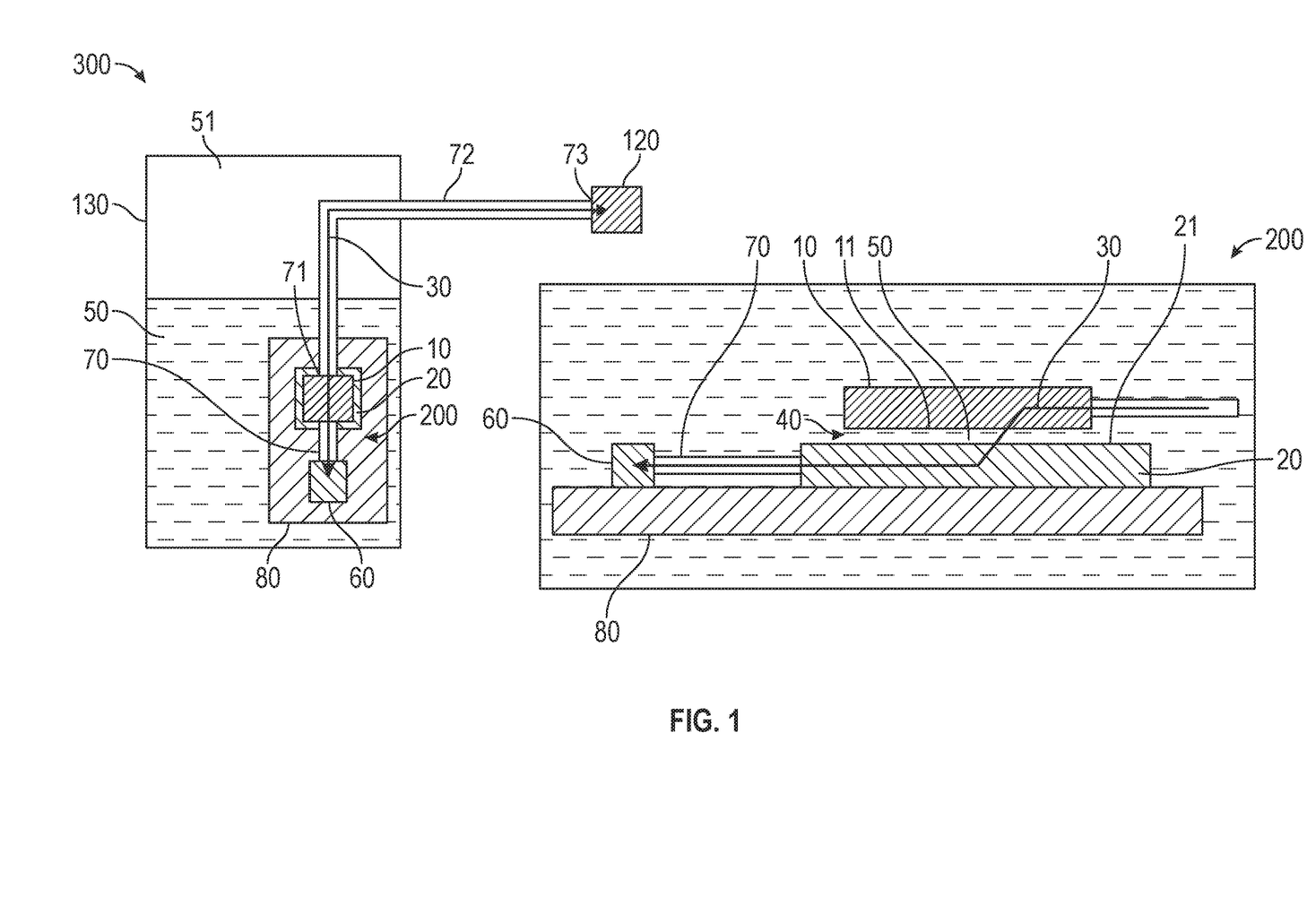
Figure 2:
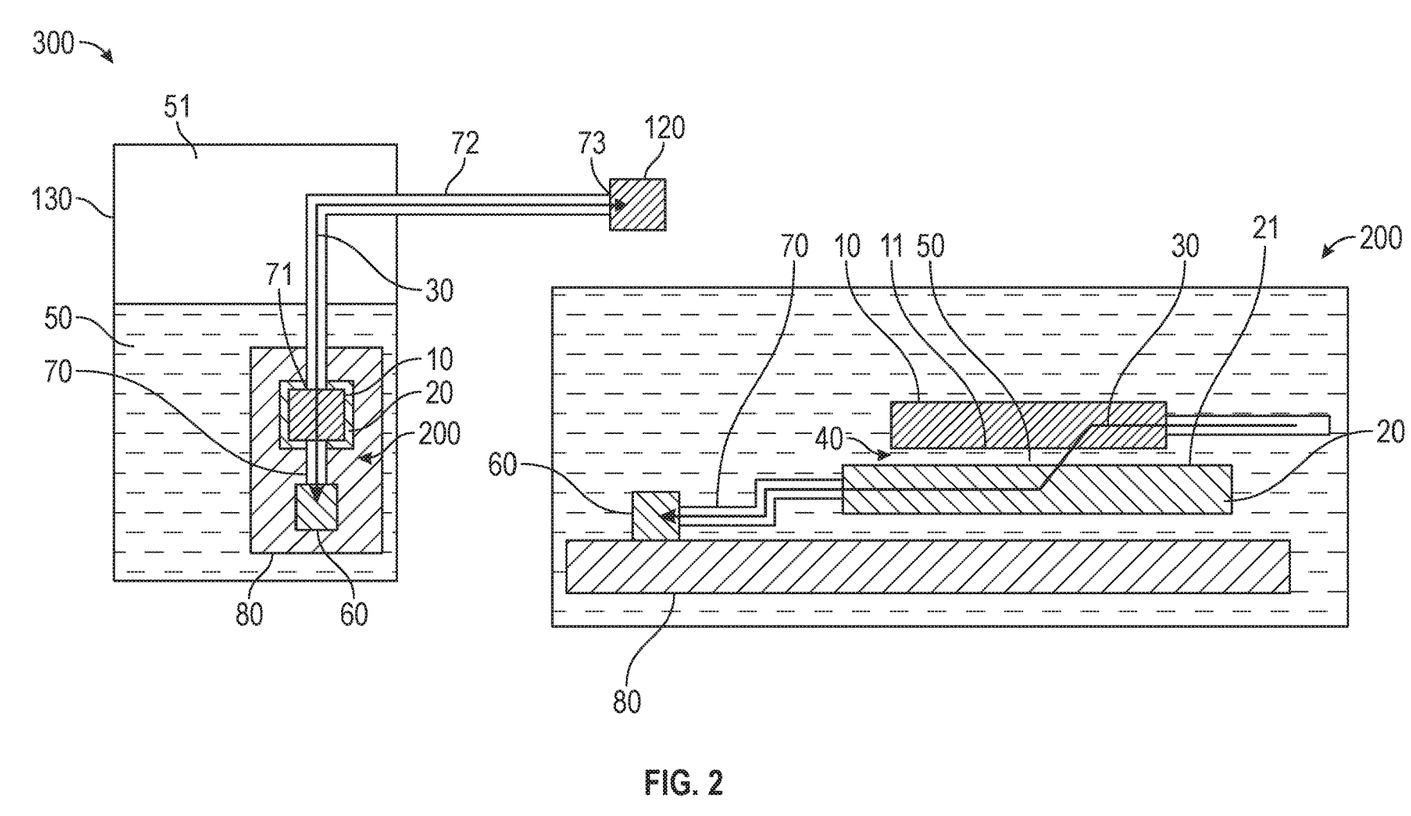

An embodiment of the disclosure as illustrated in FIGS. 1-4 relates to an optical system (200) including first (10) and second (20) optical elements for guiding light (30) therein. At least one of the first and second optical elements (10, 20) may be optically coupled to an optical transceiver (60) via one or more optical fibers (70). The transceiver may be mounted on a circuit board (80). In some aspects, at least one of the first and second optical elements (10, 20) may be mounted on a circuit board (80). In some other aspects both the first and the second optical elements may be mounted on a the circuit board (80). For each optical element (10, 20), the propagating light (30) enters or exits the optical element through a coupling surface (11, 21) of the optical element. The coupling surfaces (11, 21) of the optical elements face, and align with, each other so that light propagating in one (10) of the optical elements exits the optical element (10) through the coupling surface (11) of the optical element (10) and enters the other optical element (20) through the coupling surface (21) of the other optical element (20). According to an embodiment, the coupling surfaces (11, 21) are spaced apart from each other and define a region (40) therebetween. The region (40) is at least partially filled with a coolant (50), the coolant substantially surrounding at least one of the first and second optical elements (10, 20). In some embodiments, the coolant substantially surrounds both the first and second optical elements (10, 20). In other embodiments as best seen in FIG. 2, the second optical element (20) is spaced apart from the circuit board (80) and defines a region therebetween. The region between the second optical element (20) and the circuit board (80) is at least partially filled with a coolant (50).

Figure 4:
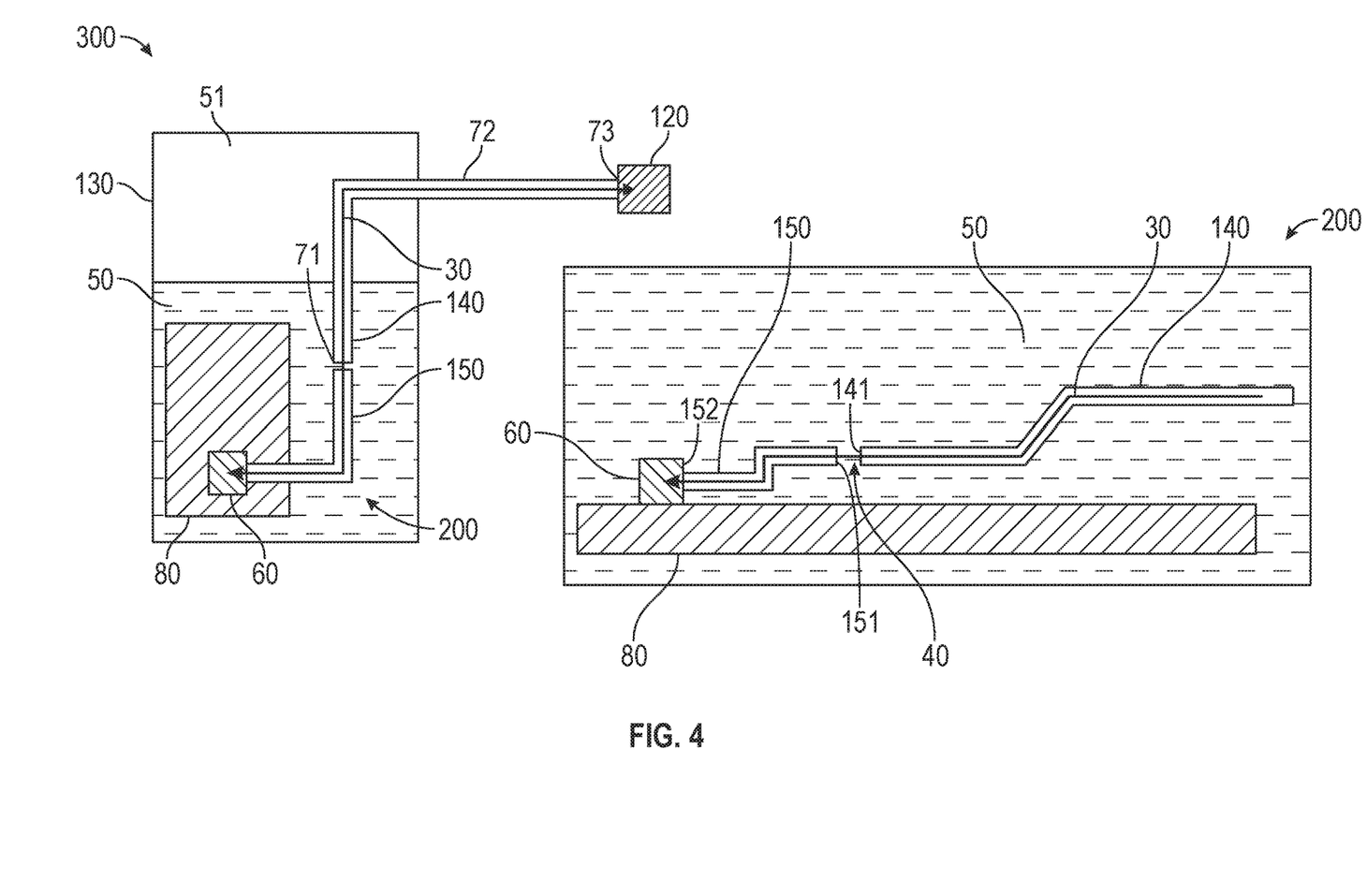

In some aspects, the coolant (50) substantially completely surrounds at least one of the first and second optical elements. In other aspects, the coolant (50) substantially completely surrounds both the first and second optical elements (10, 20), and the first and second optical elements (10, 20) are substantially suspended inside the coolant (50). In some other aspects, the region (40) is substantially completely filled with the coolant (50). In other aspects, the coolant (50) that substantially surrounds at least one of the first and second optical elements (10, 20), flows around the at least one of the first and second optical elements (10, 20). In some embodiments as best shown in FIG. 4, the first optical element has a first optical fiber (140), the second optical element has a second optical fiber (150). The coupling surface of the first optical fiber (140) is an end face (141) of the first optical fiber. The coupling surface of the second optical fiber (150) is an end face (151) of the second optical fiber. An opposite second end face (152) of the second optical fiber (150) may be optically coupled to an optical transceiver (60). The transceiver in some embodiments is mounted on a circuit board (80), and, in some aspects, the transceiver (60) and the circuit board (80) are at least partially immersed in the coolant (50).

Figure 5:
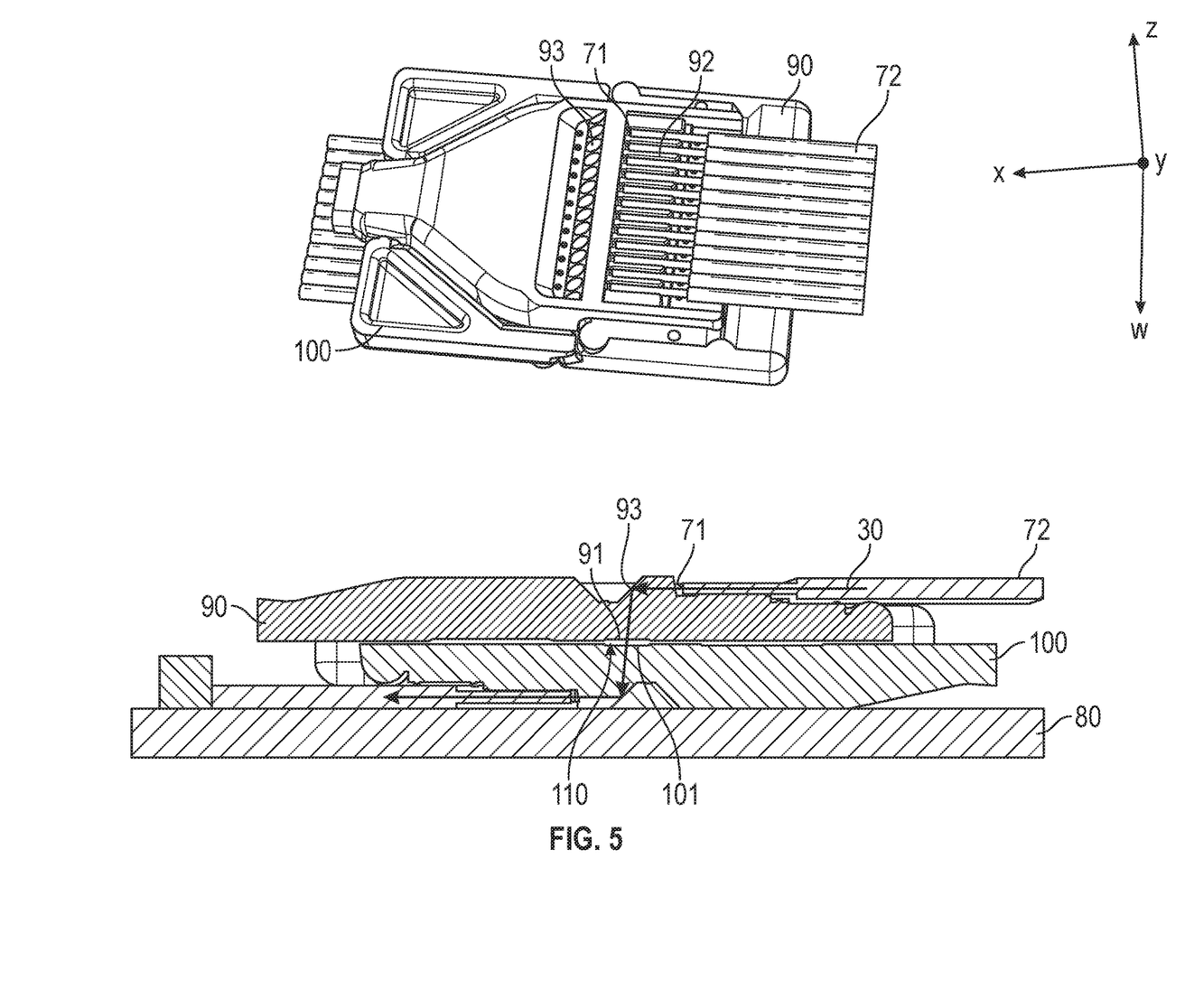
FIG. 5 schematically shows different views of an exemplary embodiment of immersion cooled optical ferrules positioned on a substrate.

In an embodiments as illustrated in FIG. 5, the first optical element includes a first optical ferrule (90) and the second optical element (20) includes a second optical ferrule (100).

Figure 3:
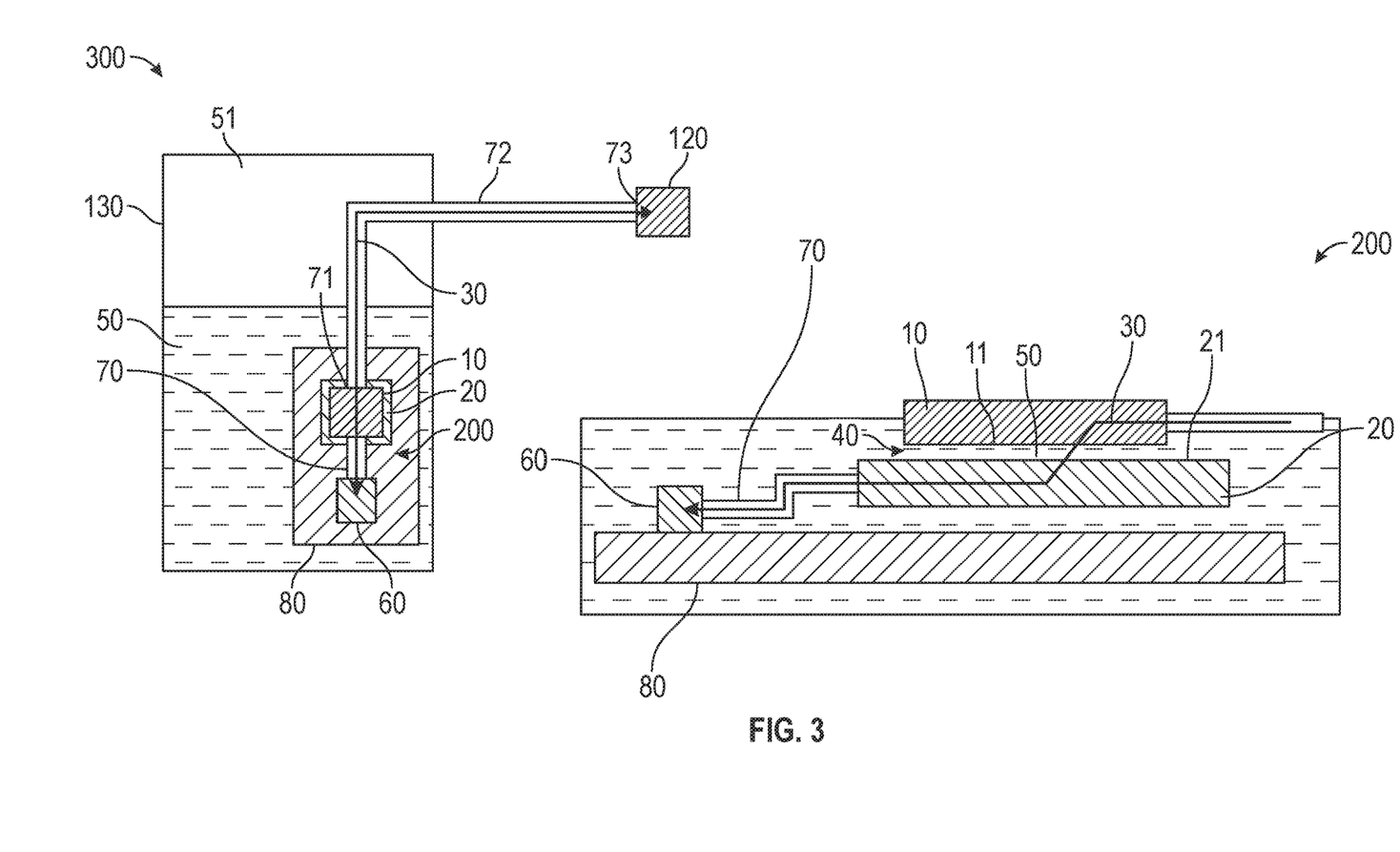

In some aspects as best illustrated in FIG. 3, one (20) of the first and second optical elements may be entirely surrounded by the coolant (50), and the other one (10) of the first and second optical elements may be only partially immersed in the coolant (50).

In some embodiments, the coolant (50) that at least partially fills the region (40) may be a liquid. In some aspects, the liquid completely fills the region (40).

In other embodiments, the coolant (50) that at least partially fills the region (40) may be a vapor (51) of a liquid coolant. In some aspects, the vapor (51) completely fills the region (40).

According to some embodiments of the disclosure, a coupling efficiency of the optical system between the optical elements (10, 20) may be greater than about 5% and/or within less than about 10% of a coupling efficiency of a comparative optical system having a same construction except that the region is filled with air.

The coolant (50) that partially or fully fills the region (40) and substantially surrounding at least one or both of the first and second optical elements, in some aspects, may be at or near a boiling temperature of the coolant. In some other aspects, the coolant may be electrically insulative.

The coolant, in some embodiments, may be any fluid capable of transferring heat, including water, volatile fluids, such as, for example, alcohols, and electronic cooling fluids as disclosed elsewhere. In certain embodiments, the coolant may be dielectric, non-flammable, and provides a significant vapor pressure at the operating temperature of the optical elements. In some embodiments, the coolant may have a dielectric constant that is less than about 4.0, or less than 2.5, or less than 2.4, or less than 2.3, or less than 2.2, or less than 2.1, or less than 2.0, or less than 1.9, as measured in accordance with ASTM D150-18 at room temperature at 1 KHz, such that optical elements may be partially or completely surrounded and/or suspended in the coolant without significant loss of signal integrity.

In certain embodiments, the coolant may be thermally conductive, chemically inert, essentially gas-free, and thermally stable. In other embodiments, the coolant has a boiling point that may be at or below the operating temperature such that portions of the coolant adjacent the optical elements will vaporize when conducting heat. In some aspects, the coolant may have a boiling point of between 30-75° C., or 35-75° C., 40-75° C., or 45-75° C., at a pressure of between about 0.5 atm and 1.5 atm. Generally, the temperature range accommodates maintaining the optical system at a sufficiently cool temperature while allowing heat to be dissipated efficiently to an ultimate heat sink (e.g., outside air). In some other aspects, the coolant may have a boiling point greater than about 40° C., or greater than about 50° C., or greater than about 60° C., or greater than about 70° C., or greater than about 75° C., at a pressure of between about 0.5 atm and 1.5 atm.

The coolant may be selected from the representative class of fluorinated linear, branched or cyclic alkanes, ethers, ketones, tertiary amines, and aminoethers, and mixtures thereof. In some embodiments, perfluorinated fluids may be used, though partially fluorinated fluids may also be used. The perfluorinated fluids may be straight chain, branched chain, cyclic, or a combination thereof. In some embodiments, the perfluorinated fluids may be saturated, that is, free of ethylenic, acetylenic, and aromatic unsaturation. The skeletal chain may include catenary oxygen and/or trivalent nitrogen heteroatoms providing stable links between fluorocarbon groups and not interfering with the inert character of the compound. In some embodiments, hydrofluoroethers, either segregated or non-segregated may be used. In other embodiments, perfluorinated ketones may be used.

In some aspects, the coolant may include one or more halogenated fluids.

In some embodiments, the coolant may include a fluorinated organic fluid including one or more of hydrofluoroethers, fluoroketones, perfluoroketones, hydrofluoroolefins, perfluorocarbons, perfluorohexanes, and perfluoromethyl morpholine.

In other embodiments, the coolant may include one or more of ethers, alkanes, perfluoroalkenes, alkenes, haloalkenes, perfluorocarbons, perfluorinated tertiary amines, perfluoroethers, cycloalkanes, esters, perfluoroketones, ketones, oxiranes, aromatics, siloxanes, hydrochlorocarbons, hydrochlorofluorocarbons, hydrofluorocarbons, hydrofluoroolefins, hydrochloroolefins, hydrochlorofluoroolefins, and hydrofluoroethers.

In some other embodiments, the coolant may include one or more of alkanes, perfluoroalkenes, haloalkenes, perfluorocarbons, perfluorinated tertiary amines, perfluoroethers, cycloalkanes, perfluoroketones, aromatic s, siloxanes, hydrochlorocarbons, hydrochlorofluorocarbons, hydrofluorocarbons, hydrofluoroolefins, hydrochlorofluoroolefins, and hydrofluoroethers.

In some embodiments, the liquid coolant (50) may have an index of refraction from about 1.2 to about 1.5, or from about 1.25 to about 1.48. In some other embodiments, the liquid coolant may have an index of refraction of about 1.366 measured at 1550 nm, being lower than the index of refraction of glass, and higher than the index of refraction of air, thereby resulting in lower Frenal losses at the glass to optical-interface-material junctions.

Some other embodiments may be directed to an immersion cooling system that may include hydrofluoroolefin containing coolants having dielectric constants of less than 2.5. The immersion cooling systems may be single-phase or two-phase immersion cooling systems.

Another embodiment of the disclosure relates to a system (300) including a first optical system (200) substantially entirely immersed in a circulating liquid coolant (50). The first optical system (200) includes first (90) and second (100) optical ferrules. The first optical ferrule (90) is optically and physically connected to a first end (71) of one or more optical fibers (72). In some aspects, the first optical ferrule (90) includes an attachment area (92), and the first ends (71) of the one or more optical fibers (72) are bonded to the first optical ferrule (90) at the attachment area (92). The first optical ferrule (90) also includes a light redirecting side (93) for receiving light along a first direction (x) and redirecting the received light along a different second direction (w). The first optical ferrule further includes a coupling surface (91).

The second optical ferrule includes a second coupling surface (101) and is mounted on a circuit board (80). The circuit board is at least partially immersed in the circulating liquid coolant. The first and second optical ferrules (90, 100) are optically coupled to each other through respective first (91) and second (101) coupling surfaces. The first and second coupling surfaces (91, 101) face, and align with, each other and define a region (110) therebetween. The region (110) is at least partially filled with at least one of the liquid coolant (50) or a vapor (51) of the liquid coolant.

The region (110) defines a separation between the first and second coupling surfaces (91, 101). In some aspects, the separation between the first and second coupling surfaces (91, 101) may be at least 200 nm, In some other aspects, the separation between the first and second coupling surfaces (91, 101) is at least 1 micron, or at least 3 microns, or at least 10 microns, or at least 20 microns, or at least 30 microns.

In some embodiments, the first and second optical ferrules (90, 100) are entirely immersed in the liquid coolant.

In some embodiments, the system (300) includes a third optical ferrule (120) optically and physically connected to an opposite second end (73) of the one or more optical fibers (72). In some cases, no portion of the third optical ferrule (120) is immersed in the liquid coolant (50).

As shown in FIG. 1-4, the circulating liquid coolant (50) is contained in a tank (130), and during operation, the tank (130) includes a mixture of the liquid coolant (50) and the vapor (51) of the liquid coolant therein. In some embodiments, the mixture may include one or more of air and water vapor.

In some embodiments, the liquid coolant (50) may have an index of refraction from about 1.2 to about 1.5, or from about 1.25 to about 1.48.

In some other embodiments, the liquid coolant (50) circulates naturally due to one or more of heat-induced convection, and at least portions of the liquid coolant being near its boiling temperature.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific Embodiments shown and described without departing from the scope of the present disclosure. This application is intended to cover any adaptations or variations of the specific Embodiments discussed herein. Therefore, it is intended that this disclosure be limited only by the claims and the equivalents thereof.

The invention claimed is:

1. An optical system comprising first and second optical elements for guiding light therein, for each optical element, the propagating light entering or exiting the optical element through a coupling surface of the optical element, the coupling surfaces of the optical elements facing, and aligned with, each other so that light propagating in one of the optical elements exits the optical element through the coupling surface of the optical element and enters the other optical element through the coupling surface of the other optical element, the coupling surfaces spaced apart from each other and defining a region therebetween, the region at least partially filled with a coolant, the coolant substantially surrounding at least one of the first and second optical elements, wherein the coolant that at least partially fills the region is a vapor of a liquid coolant, and wherein the vapor completely fills the region.

2. An optical system comprising first and second optical elements for guiding light therein, for each optical element, the propagating light entering or exiting the optical element through a coupling surface of the optical element, the coupling surfaces of the optical elements facing, and aligned with, each other so that light propagating in one of the optical elements exits the optical element through the coupling surface of the optical element and enters the other optical element through the coupling surface of the other optical element, the coupling surfaces spaced apart from each other and defining a region therebetween, the region at least partially filled with a coolant, the coolant substantially surrounding at least one of the first and second optical elements, wherein the coolant that at least partially fills the region is a liquid, wherein the liquid completely fills the region, and wherein the optical system has a coupling efficiency between the optical elements that is within less than about 5% of a coupling efficiency of a comparative optical system having a same construction except that the region is filled with air.

3. An optical system comprising first and second optical elements for guiding light therein, for each optical element, the propagating light entering or exiting the optical elements through a coupling surface of the optical element, the coupling surfaces of the optical elements facing, and aligned with, each other so that light propagating in one of the optical elements exits the optical element through the coupling surface of the optical element and enters the other optical element through the coupling surface of the other optical element, the coupling surfaces spaced apart from each other and defining a region therebetween, the region at least partially filled with coolant, the coolant substantially surrounding at least one of the first and second optical elements, wherein the first optical element comprises a first optical ferrule and the second optical element comprises a second optical ferrule.

4. An optical system comprising first and second optical elements for guiding light therein, for each optical element, the propagating light entering or exiting the optical element through a coupling surface of the optical element, the coupling surfaces of the optical elements facing, and aligned with, each other so that light propagating in one of the optical elements exits the optical element through the coupling surface of the optical element, the coupling surfaces spaced apart from each other and defining a region therebetween, the region at least partially filled with a coolant, the coolant substantially surrounding at least one of the first and second optical elements, wherein at a pressure of between about 0.5 atm and 1.5 atm, the coolant has a boiling point of between 30-75° C.

5. An optical system comprising first and second optical elements for guiding light therein, for each optical element, the propagating light entering or exiting the optical element through a coupling surface of the optical element, the coupling surfaces of the optical elements facing, and aligned with, each other so that light propagating in one of the optical elements exits the optical element through the coupling surface of the optical element and enters the other optical element through the coupling surface of the other optical element, the coupling surfaces spaced apart from each other and defining a region therebetween, the region at least partially filled with a coolant, the coolant substantially surrounding at least one of the first and second optical elements, wherein at least one of the first and second optical elements is optically coupled to an optical transceiver via one or more optical fibers, the transceiver mounted on a circuit board, the transceiver and the circuit board at least partially immersed in the coolant.

6. The optical system of claim 3, wherein at least one of the first and second optical elements is mounted on a circuit board.

7. The optical system of claim 3, wherein the coolant substantially completely surrounds both the first and second optical elements, and the first and second optical elements are substantially suspended inside the coolant.

8. The optical system of claim 3, wherein the region is substantially completely filled with the coolant, and wherein the coolant that substantially surrounds at least one of the first and second optical elements, flows around the at least one of the first and second optical elements.

9. An optical system comprising first and second optical elements for guiding light therein, for each optical element, the propagating light entering or exiting the optical element through a coupling surface of the optical element, the coupling surfaces of the optical elements facing, and aligned with, each other so that light propagating in one of the optical elements exits the optical element through the coupling surface of the optical element and enters the other optical element through the coupling surface of the other optical element, the coupling surfaces spaced apart from each other and defining a region therebetween, the region at least partially filled with a coolant, the coolant substantially surround at least one of the first and second optical elements, wherein the first optical element comprises a first optical fiber, the second optical element comprises a second optical fiber, the coupling surface of the first optical fiber is an end face of the first optical fiber, and the coupling surface of the second optical fiber is an end face of the second optical fiber, and wherein an opposite second end face of the second optical fiber is optically coupled to an optical transceiver, the transceiver mounted on a circuit board, the transceiver and the circuit board at least partially immersed in the coolant.

10. A system comprising a first optical system substantially entirely immersed in a circulating liquid coolant, the first optical system comprising first and second optical ferrules, the first optical ferrule optically and physically connected to a first end of one or more optical fibers, the second optical ferrule mounted on a circuit board, the circuit board at least partially immersed in the circulating liquid coolant, the first and second optical ferrules optically coupled to each other through respective first and second coupling surfaces facing, and aligned with, each other and defining a region therebetween, the region at least partially filled with at least one of the liquid coolant or a vapor of the liquid coolant, wherein first optical ferrule comprises:
   an attachment area, the first ends of the one or more optical fibers bonded to the first optical ferrule at the attachment area;
   a light redirecting side for receiving light along a first direction and redirecting the received light along a different second direction; and
   the first coupling surface.

11. The system of claim 10, wherein the first and second optical ferrules are entirely immersed in the liquid coolant.

12. The system of claim 10 further comprising a third optical ferrule optically and physically connected to an opposite second end of the one or more optical fibers, wherein no portion of the third optical ferrule is immersed in the liquid coolant.

13. The system of claim 10, wherein the circulating liquid coolant is contained in a tank, and wherein during operation, the tank comprises a mixture of the liquid coolant and the vapor of the liquid coolant therein, and wherein the mixture further comprises one or more of air and water vapor.

14. The system of claim 10, wherein a separation between the first and second coupling surfaces is at least 20 microns.

* * * * *

UNITED STATES PATENT AND TRADEMARK OFFICE
CERTIFICATE OF CORRECTION

PATENT NO. : 11,009,653 B2  
APPLICATION NO. : 15/929594  
DATED : May 18, 2021  
INVENTOR(S) : William Clatanoff et al.

Page 1 of 1

It is certified that error appears in the above-identified patent and that said Letters Patent is hereby corrected as shown below:

In the Claims

<u>Column 6,</u>
Line 61, in Claim 4, after "element" insert -- and enters the other optical element through the coupling surface of the other optical element --.

Signed and Sealed this
Twenty-third Day of November, 2021

Drew Hirshfeld
*Performing the Functions and Duties of the*
*Under Secretary of Commerce for Intellectual Property and*
*Director of the United States Patent and Trademark Office*